US009650760B2

(12) United States Patent
Sakon (10) Patent No.: US 9,650,760 B2
(45) Date of Patent: May 16, 2017

(54) WORK VEHICLE (71) Applicant: Komatsu Ltd., Tokyo (JP)

(72) Inventor: Yuu Sakon, Hitachinaka (JP)

(73) Assignee: Komatsu Ltd., Tokyo (JP)

( * ) Notice: Subject to any disclaimer, the term of this patent is extended or adjusted under 35 U.S.C. 154(b) by 81 days.

(21) Appl. No.: 14/769,929

(22) PCT Filed: Dec. 3, 2014

(86) PCT No.: PCT/JP2014/082038
§ 371 (c)(1),
(2) Date: Aug. 24, 2015

(87) PCT Pub. No.: WO2015/083753
PCT Pub. Date: Jun. 11, 2015

(65) Prior Publication Data
US 2016/0002883 A1 Jan. 7, 2016

(30) Foreign Application Priority Data

Dec. 3, 2013 (JP) ................... 2013-250164

(51) Int. Cl.
*E02F 9/22* (2006.01)
*B60W 10/02* (2006.01)
(Continued)

(52) U.S. Cl.
CPC ........... *E02F 9/2079* (2013.01); *B60W 10/02* (2013.01); *B60W 10/06* (2013.01); *E02F 3/34* (2013.01);
(Continued)

(58) Field of Classification Search
CPC ................ B60W 10/02; B60W 10/06; B60W 2050/0008; B60W 2050/0011;
(Continued)

(56) References Cited

U.S. PATENT DOCUMENTS 5,996,703 A * 12/1999 Yamamoto ............. E02F 3/845
172/4.5
6,247,538 B1 6/2001 Takeda et al.
(Continued)

FOREIGN PATENT DOCUMENTS

EP 2267230 A1 12/2010
EP 2551163 A1 1/2013
(Continued)

OTHER PUBLICATIONS

International Search Report mailed Mar. 31, 2015, issued for PCT/JP2014/082038.
(Continued)

*Primary Examiner* — Ramya Burgess
*Assistant Examiner* — David Morris
(74) *Attorney, Agent, or Firm* — Locke Lord LLP (57) ABSTRACT

A control device of a wheel loader obtains a first ratio between a value corresponding to a target traveling distance for the wheel loader, when it travels to a discharge position where an excavated substance is discharged after an excavation with a bucket, and a value corresponding to a target elevation amount for an elevation of a boom after a motion is started. The control device also obtains a second ratio between a value corresponding to an actual traveling distance after the wheel loader starts its motion to the position where the excavated substance is discharged after the excavation with the bucket, and a value corresponding to an actual elevation amount of the boom after the motion is started. The control device then controls a transmission toque transmitted to a drive wheel from an engine in order that a difference between the first ratio and the second ratio becomes zero.

6 Claims, 6 Drawing Sheets

(51) Int. Cl.
*B60W 10/06* (2006.01)
*E02F 9/20* (2006.01)
*F16D 48/06* (2006.01)
*E02F 3/34* (2006.01)
*F16D 48/02* (2006.01)
*B60W 50/00* (2006.01)

(52) U.S. Cl.
CPC .......... *E02F 9/2253* (2013.01); *E02F 9/2296* (2013.01); *F16D 48/02* (2013.01); *F16D 48/06* (2013.01); *B60W 2050/0008* (2013.01); *B60W 2050/0011* (2013.01); *B60W 2050/0012* (2013.01); *B60W 2050/0063* (2013.01); *B60W 2300/12* (2013.01); *B60W 2710/021* (2013.01); *B60W 2710/025* (2013.01); *B60W 2710/027* (2013.01); *B60W 2710/06* (2013.01); *B60W 2710/0666* (2013.01); *F16D 2500/10437* (2013.01); *F16D 2500/1112* (2013.01); *F16D 2500/30412* (2013.01); *F16D 2500/30421* (2013.01); *F16D 2500/70626* (2013.01); *F16D 2500/70631* (2013.01)

(58) Field of Classification Search
CPC . B60W 2050/0012; B60W 2050/0063; B60W 2300/17; B60W 2710/021; B60W 2710/025; B60W 2710/027; B60W 2710/06; B60W 2710/0666; F16D 2500/7061; F16D 2500/70626; F16D 2500/70631
See application file for complete search history.

(56) References Cited

U.S. PATENT DOCUMENTS

| 2012/0296531 A1 | 11/2012 | Hyodo et al. |
| 2012/0310494 A1 | 12/2012 | Asami et al. |
| 2014/0379243 A1 | 12/2014 | Hyodo et al. |

FOREIGN PATENT DOCUMENTS

| JP | 10-088625 A | 4/1998 |
| JP | 2008-248523 A | 10/2008 |
| JP | 2011-063945 A | 3/2011 |
| WO | 98/11305 A1 | 3/1998 |
| WO | WO-2011/074583 A1 | 6/2011 |
| WO | WO-2013/115399 A1 | 8/2013 |

OTHER PUBLICATIONS

Supplementary European Search Report dated Sep. 2, 2016, issued for European patent application No. 14868160.4.

* cited by examiner

WORK VEHICLE

FIELD

The present invention relates to a work vehicle carrying out an excavation work.

BACKGROUND

There are work vehicles provided with working machines for loading earth and sand or crushed stones on a dump truck or the like. A wheel loader has been known as such work vehicles. A wheel loader is a vehicle having a bucket for performing an excavation work and traveling with tires for work. For example, Patent Literature 1 describes a wheel loader that distributes an engine output to a working machine and a traveling apparatus so as to be adapted to different loading works for each work site.

CITATION LIST

Patent Literature

Patent Literature 1: Unexamined Japanese Patent Application No. 2008-248523

SUMMARY

Technical Problem

A wheel loader loads excavated substances (excavated substances) on a carrier such as a dump truck. In this case, the wheel loader moves from an excavation position to the position of the carrier. In this case, an operator of the wheel loader moves the wheel loader to the position of the carrier while elevating a boom. This work needs an accelerator operation and a brake operation, which might increase a load of the operator.

The present invention aims to reduce a load of an operator during an operation of moving a work vehicle to a position where excavated substances are to be discharged after the work vehicle finishes the excavation work.

Solution to Problem

According to the present invention, a work vehicle comprises: a body; a power generating device that generates power for allowing the body to travel; a driving wheel that travels the body with power generated by the power generating device; a boom that is supported to the body so as to swing, and supports a bucket at a side opposite to the body; an actuator that swings the boom; and a control device that controls a transmission torque transmitted to the driving wheel from the power generating device in such a manner that a difference between a first ratio and a second ratio becomes zero, the first ratio being a ratio between a value corresponding to a target traveling distance that is a target for the body when the body travels to a position where an excavated substance is discharged after an excavation with the bucket, and a value corresponding to a target elevation amount that is a target for an elevation of the boom after a start of a motion, the second ratio being a ratio between a value corresponding to an actual traveling distance of the body after the body starts the body's motion to the position where the excavated substance is discharged after the excavation with the bucket, and a value corresponding to an actual elevation amount of the boom after the motion is started.

In the present invention, it is preferable that the work vehicle comprises a clutch between the power generating device and the driving wheel, wherein the control device controls the transmission torque by adjusting an engagement state of the clutch.

In the present invention, it is preferable that the work vehicle comprises: a torque converter which transmits power from the clutch to the driving wheel between the clutch and the driving wheel, wherein the control device applies a feedforward control to the transmission torque by using a ratio between a torque absorbed by the torque converter and a maximum torque that the clutch can transmit.

In the present invention, it is preferable that the control device controls a torque generated by the power generating device according to the engagement state of the clutch.

In the present invention, it is preferable that the work vehicle comprises: a target value changing unit that changes at least one of the target traveling distance and the target elevation amount.

According to the present invention, a work vehicle comprises: a body; a power generating device that generates power for allowing the body to travel; a driving wheel that travels the body with power generated by the power generating device; a clutch provided between the power generating device and the driving wheel; a torque converter provided between the clutch and the driving wheel; a boom that is supported to the body so as to swing, and supports a bucket at a side opposite to the body; a hydraulic cylinder that swings the boom; and a control device that applies a feedback control to an engagement state of the clutch and applies a feedforward control to the engagement state of the clutch by using a ratio between a torque absorbed by the torque converter and a maximum torque that the clutch can transmit, in such a manner that a difference between a first ratio and a second ratio becomes zero, the first ratio being a ratio between a value corresponding to a target traveling distance that is a target for the body when the body travels to a position where an excavated substance is discharged after an excavation with the bucket, and a value corresponding to a target elevation amount that is a target for an elevation of the boom after a start of a motion, the second ratio being a ratio between a value corresponding to an actual traveling distance of the body after the body starts the body's motion to the position where the excavated substance is discharged after the excavation with the bucket, and a value corresponding to an actual elevation amount of the boom after the motion is started.

Advantageous Effects of Invention

The present invention can reduce a load of an operator during an operation of moving a work vehicle to a position where excavated substances are to be discharged after the work vehicle finishes the excavation work.

DESCRIPTION OF EMBODIMENTS

The embodiments of the present invention will be described in detail with reference to the drawings.

<Wheel Loader>

Figure 1:
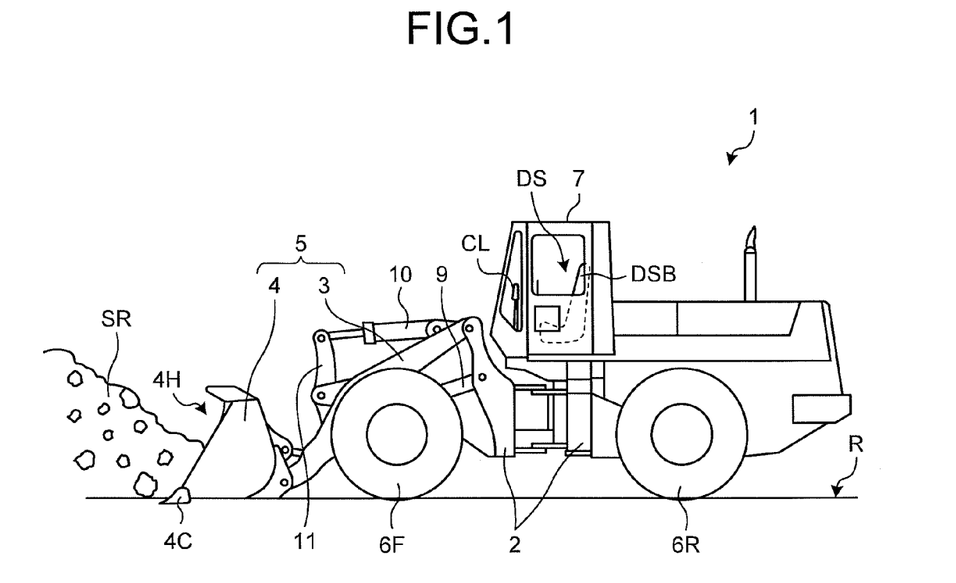
FIG. 1 is a view illustrating a work vehicle according to an embodiment of the present invention.

FIG. 1 is a view illustrating a work vehicle according to an embodiment of the present invention. The present embodiment describes, as one example of a work vehicle, a wheel loader 1 which loads crushed stones, or earth and sand or rocks which are generated in an excavation work of crushed stones onto a carrier such as a dump truck.

The wheel loader 1 includes a body 2; a working machine 5 having a boom 3 and a bucket 4; front wheels 6F and rear wheels 6R; a driver's cab 7; a boom cylinder 9; and a bucket cylinder 10. The working machine 5, the front wheels 6F, the rear wheels 6R, and the driver's cab 7 are mounted to the body 2. A driver's seat DS and a control lever CL are provided in the driver's cab 7. The direction from a back DSB of the driver's seat DS to the control lever CL is defined as front, and the direction from the control lever CL to the back DSB is defined as rear. The left and right of the wheel loader 1 are supposed to be defined with respect to the front.

The front wheels 6F and the rear wheels 6R contact a road surface R. The side of the front wheels 6F and the rear wheels 6R close to the contact plane is defined as downward, and the side of the front wheels 6F and the rear wheels 6R away from the contact plane is defined as upward. The wheel loader 1 travels with the rotation of the front wheels 6F and the rear wheels 6R. The body 2 is bent between the front wheels 6F and the rear wheels 6R, and this can implement steering of the wheel loader 1.

The working machine 5 is mounted at the front of the body 2. The boom 3 is supported on the front of the body 2, and extends forward. The boom 3 swings as being supported by the body 2. The bucket 4 has an opening 4H and a claw 4C. The claw 4C scoops earth and sand or crushed stones, whereby the bucket 4 excavates a subject. Earth and sand or crushed stones scooped by the claw 4C are appropriately referred to as an excavated substance SR. The excavated substance SR scooped by the claw 4C enters the bucket 4 through the opening 4H. The bucket 4 swings as being supported by the boom 3 at the opposite side of the body 2.

A boom cylinder 9 serving as a boom driving device is provided between the body 2 and the boom 3. The boom 3 swings around the support portion at the body 2 with extension/retraction of the boom cylinder 9. The boom driving device for swinging the boom 3 is not limited to the boom cylinder 9. For example, the boom driving device may be an electric motor provided to the base of the boom 3. As described above, the boom driving device is an actuator for swinging the boom 3.

A bucket cylinder 10 has one end mounted and supported on the body 2, and other end mounted to one end of a bell crank 11. The other end of the bell crank 11 is connected to the bucket 4. The bucket 4 swings around the portion supported by the boom 3 with extension/retraction of the bucket cylinder 10. The device for swinging the bucket 4 is not limited to the bucket cylinder 10.

The control lever CL controls the extension and retraction of the boom cylinder 9 and the bucket cylinder 10. When an operator aboard the driver's cab 7 operates the control lever CL, at least one of the boom cylinder 9 and the bucket cylinder 10 extends or retracts. With this, at least one of the boom 3 and the bucket 4 swings. In this way, the boom 3 and the bucket 4 move by the operator's operation on the control lever CL.

<Control System of Working Machine 5>

Figure 2:
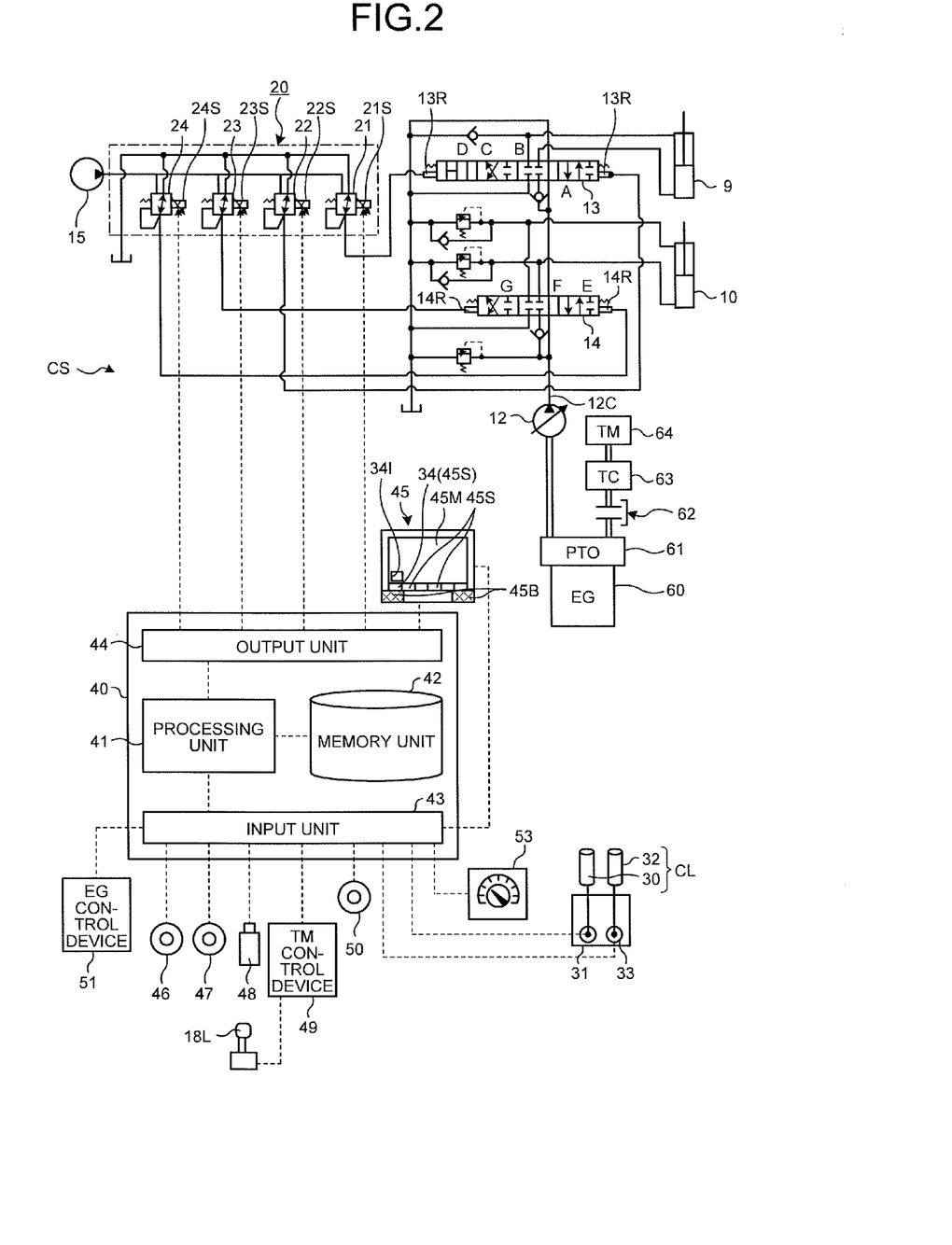
FIG. 2 is a diagram illustrating a control system controlling an action of a working machine.

FIG. 2 is a diagram illustrating a control system controlling an action of the working machine. The control system CS controlling the action of the working machine 5 illustrated in FIG. 1, i.e., the actions of the boom 3 and the bucket 4, includes a working machine hydraulic pump 12, a boom operation valve 13, a bucket operation valve 14, a pilot pump 15, a discharge circuit 12C, an electromagnetic proportional control valve 20, a control device 40, a TM (transmission) control device 49, and an EG (engine) control device 51.

The working machine hydraulic pump 12 is driven by an engine (EG) 60 serving as a power generating device mounted on the wheel loader 1. The engine 60 is an internal combustion engine, and it is a diesel engine in the present embodiment. A type of the engine 60 is not limited to a diesel engine. An output of the engine 60 is outputted to the working machine hydraulic pump 12 and a clutch 62 serving as a power transmission mechanism after being inputted to a PTO (Power Take Off) 61. With this structure, the working machine hydraulic pump 12 is driven by the engine 60 through the PTO 61 to discharge operating oil.

An input side of the clutch 62 is connected to the engine 60, while an output side is connected to a torque converter (TC) 63. An output side of the torque converter 63 is connected to the transmission (TM) device 64. With this structure, the output from the engine 60 is transmitted to the transmission device 64 via the PTO 61, the clutch 62, and the torque converter 63. The transmission device 64 transmits the output from the engine 60 transmitted from the PTO 61 to the front wheels 6F and the rear wheels 6R illustrated in FIG. 1 to drive these wheels. The front wheels 6F and the rear wheels 6R are driven by the output from the engine 60, whereby the wheel loader 1 and the body 2 travel. The front wheels 6F and the rear wheels 6R are drive wheels of the wheel loader 1.

The discharge circuit 12C serving as an oil passage through which operating oil passes is connected to a discharge port from which the operating oil is discharged by the working machine hydraulic pump 12. The discharge circuit 12C is connected to the boom operation valve 13 and the bucket operation valve 14. The boom operation valve 13 and the bucket operation valve 14 are both operation valves of a hydraulic pilot type. The boom operation valve 13 and the bucket operation valve 14 are respectively connected to the boom cylinder 9 and the bucket cylinder 10. The working machine hydraulic pump 12, the boom operation valve 13, the bucket operation valve 14, and the discharge circuit 12C form a tandem-type hydraulic circuit.

The boom operation valve 13 is a 4-way selector valve having an A position, a B position, a C position, and a D position. When the boom operation valve 13 is at the A position, the boom 3 moves up. When at the B position, the boom 3 is neutral. When at the C position, the boom 3 moves down, and when at the D position, the boom 3 keeps its position. The bucket operation valve 14 is a 3-way selector valve having an E position, an F position, and a G position. When the bucket operation valve 14 is at the E position, the bucket 4 performs a tilt action. When at the F position, the bucket 4 is neutral, and when at the G position, the bucket 4 performs a dump action.

The tilt action of the bucket 4 is an action in which the opening 4H and the claw 4C of the bucket 4 illustrated in FIG. 1 swing toward the driver's cab 7 to tilt. In contrast to the tilt action, the dump action of the bucket 4 is an action in which the opening 4H and the claw 4C of the bucket 4 swing to be away from the driver's cab 7 to tilt.

Pilot pressure receiving portions of the boom operation valve 13 and the bucket operation valve 14 are respectively connected to the pilot pump 15 via the electromagnetic proportional control valve 20. The pilot pump 15 is connected to the PTO 61, and driven by the engine 60. The pilot pump 15 supplies operating oil in a predetermined pressure (pilot pressure) to a pilot pressure receiving portion 13R of the boom operation valve 13 and a pilot pressure receiving portion 14R of the bucket operation valve 14 via the electromagnetic proportional control valve 20.

The electromagnetic proportional control valve 20 includes a boom-lowering electromagnetic proportional control valve 21, a boom-elevating electromagnetic proportional control valve 22, a bucket dump electromagnetic proportional control valve 23, and a bucket tilt electromagnetic proportional control valve 24. The boom-lowering electromagnetic proportional control valve 21 and the boom-elevating electromagnetic proportional control valve 22 are respectively connected to the pilot pressure receiving portions 13R and 13R of the boom operation valve 13. The bucket dump electromagnetic proportional control valve 23 and the bucket tilt electromagnetic proportional control valve 24 are respectively connected to the pilot pressure receiving portions 14R and 14R of the bucket operation valve 14. Respective command signals are inputted from the control device 40 to a solenoid command portion 21S of the boom-lowering electromagnetic proportional control valve 21, a solenoid command portion 22S of the boom-elevating electromagnetic proportional control valve 22, a solenoid command portion 23S of the bucket dump electromagnetic proportional control valve 23, and a solenoid command portion 24S of the bucket tilt electromagnetic proportional control valve 24.

The boom-lowering electromagnetic proportional control valve 21, the boom-elevating electromagnetic proportional control valve 22, the boom operation valve 13, and the boom cylinder 9 have a function as a boom driving unit for swinging (lowering and elevating) the boom 3. The bucket dump electromagnetic proportional control valve 23, the bucket tilt electromagnetic proportional control valve 24, the bucket operation valve 14, and the bucket cylinder 10 have a function as a bucket driving unit for swinging the bucket (allowing the bucket to perform the tilt action or the dump action).

The control device 40 is a computer, for example. The control device 40 includes a processing unit 41 such as a CPU (Central Processing Unit), a memory unit 42 such as a ROM (Read Only Memory), an input unit 43, and an output unit 44. The processing unit 41 sequentially executes various commands written on a computer program to control the action of the working machine 5. The processing unit 41 is electrically connected to the memory unit 42, the input unit 43, and the output unit 44. With this structure, the processing unit 41 can read information stored in the memory unit 42, write information on the memory unit 42, receive information from the input unit 43, and output information to the output unit 44.

The memory unit 42 stores a computer program for controlling the action of the working machine 5 and information used for controlling the action of the working machine 5. In the present embodiment, the memory unit 42 stores a computer program for implementing the control of the work vehicle according to the present embodiment. The processing unit 41 reads and executes this computer program from the memory unit 42 to implement a control method of the work vehicle according to the present embodiment.

A boom angle detection sensor 46, a bucket angle detection sensor 47, a boom cylinder pressure sensor 48 detecting a pressure (bottom pressure) of the operating oil filled in the boom cylinder 9, a TM control device 49 controlling the transmission device 64, a speed sensor 50, an engine control device 51 controlling the engine 60, a first potentiometer 31, a second potentiometer 33, an input/output device 45, and a setting dial 53 serving as a target value changing unit are connected to the input unit 43. The processing unit 41 acquires detection values or command values from these components to control the action of the working machine 5.

The speed sensor 50 serving as a speed detection device detects a traveling speed (vehicle speed) of the wheel loader 1. The speed sensor 50 may acquire the speed of the wheel loader 1 from the revolution speed of the output shaft of the transmission device 64 illustrated in FIG. 2, for example. The TM control device 49 changes a speed stage of the transmission device 64. In this case, the TM control device 49 controls the speed stage based on the speed acquired from the speed sensor 50 and the accelerator opening of the wheel loader 1, for example. The engine control device 51 controls the output from the engine 60 by adjusting an amount of fuel supplied to the engine 60 based on the accelerator opening and the engine speed of the engine 60, for example. In the present embodiment, a computer can be used for both the TM control device 49 and the engine control device 51.

The solenoid command portion 21S of the boom-lowering electromagnetic proportional control valve 21, the solenoid command portion 22S of the boom-elevating electromagnetic proportional control valve 22, the solenoid command portion 23S of the bucket dump electromagnetic proportional control valve 23, the solenoid command portion 24S of the bucket tilt electromagnetic proportional control valve 24, and the input/output device 45 are connected to the output unit 44. The processing unit 41 supplies a command value for operating the boom cylinder 9 to the solenoid command portion 21S of the boom-lowering electromagnetic proportional control valve 21 or the solenoid command portion 22S of the boom-elevating electromagnetic proportional control valve 22 to extend or retract the boom cylinder 9. The boom 3 moves up and down by the extension and retraction of the boom cylinder 9. The processing unit 41 supplies a command value for operating the boom cylinder 9 to the solenoid command portion 23S of the bucket dump electromagnetic proportional control valve 23 or the solenoid command portion 24S of the bucket tilt electromagnetic proportional control valve 24 to extend or retract the bucket cylinder 10. The bucket 4 performs the tilt action or the dump action with the extension/retraction of the bucket cylinder 10. In this way, the processing unit 41 controls the action of the working machine 5, i.e., the actions of the boom 3 and the bucket 4.

The input/output device 45 connected to both the input unit 43 and the output unit 44 includes an input device 45S, a sound generating device 45B, and a display device 45M. The input/output device 45 inputs a command value to the control device 40 from the input device 45S, allows the sound generating device 45B to generate an alarm, and allows the display device 45M to display a status of the working machine 5 or the information concerning the control. The input device 45S is, for example, a push-button switch. The information displayed on the display device 45M is changed, or the operation mode of the wheel loader 1 is changed, by the operation of the input device 45S.

A function of changing the operation mode of the wheel loader 1 and changing the display on the display device 45M is assigned to each of the input devices 45S. In the example in FIG. 2, a function of starting a dump approach mode is assigned to one input device 45S as one of the operation modes. The dump approach mode is a control of the wheel loader 1 according to the present embodiment. The dump approach mode is a mode for executing a control of automatically elevating the boom 3 during the period from when the wheel loader 1 retreats from the excavation position after the excavation till it moves to the place where the excavated substances SR retained in the bucket 4 are discharged. For this, the input device 45S serves as a start switch 34 for the dump approach mode in the present embodiment. When the start switch 34 is operated, the input/output device 45 generates a start signal of the dump approach mode. This start signal is inputted to the control device 40.

When the start signal is inputted, the control device 40 controls the wheel loader 1 in the dump approach mode. Simultaneously, the control device 40 displays an icon 34I on the display device 45M. The icon 34I indicates that the dump approach mode is ON. Notably, the input device 45S of the input/output device 45 may be incorporated into the display device 45M as a touch panel, and the icon 34I may be used as the start switch 34.

The control lever CL includes a boom operation lever 30 and a bucket operation lever 32. The boom operation lever 30 is provided with the first potentiometer 31 detecting its operation amount. The bucket operation lever 32 is provided with the second potentiometer 33 detecting its operation amount. Detection signals of the first potentiometer 31 and the second potentiometer 33 are inputted to the input unit 43 of the control device 40. A selector lever 18L of the transmission device 64 changes the speed stage of the transmission device 64 or switches between a forward movement and a reverse movement. The setting dial 53 changes a target value for the execution of the dump approach mode by the control device 40.

<Structure and Action of Working Machine 5>

Figure 3:
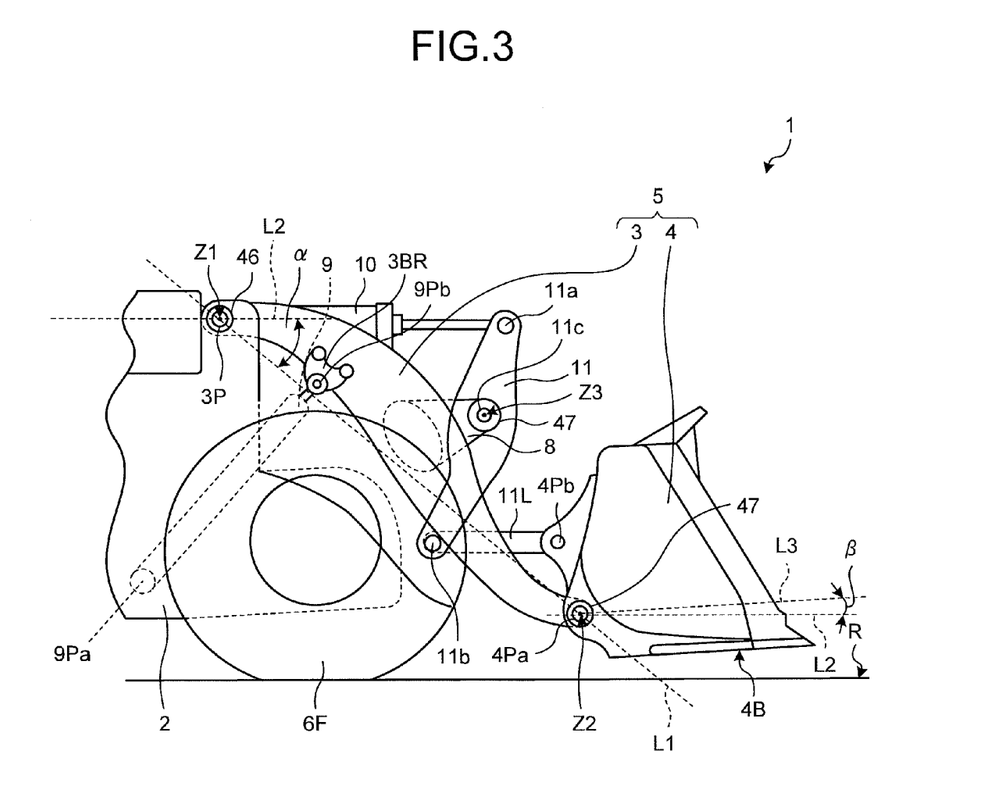
FIG. 3 is a view illustrating the working machine.

FIG. 3 is view illustrating the working machine 5. The boom 3 of the working machine 5 is pin-connected to the body 2 with a connection pin 3P at its first end. A bracket 3BR for mounting the boom cylinder 9 is mounted between both ends of the boom 3. The boom cylinder 9 is pin-connected to the body 2 with a connection pin 9Pa at its first end and pin-connected to the bracket 3BR with a connection pin 9Pb at its second end. With this structure, the boom 3 swings (moves up and down) about a center axis Z1 of the connection pin 3P, when the boom cylinder 9 extends or retracts.

The bucket 4 is pin-connected to the second end of the boom 3, i.e., the end opposite to the body 2, with a connection pin 4Pa. With this structure, the bucket 4 swings about a center axis Z2 of the connection pin 4Pa. The bucket cylinder 10 is pin-connected to the body 2 with a connection pin 3P at its first end and pin-connected to a first end of the bell crank 11 with a connection pin 11a at its second end. The second end of the bell crank 11 is pin-connected to a first end of a connection member 11L with a connection pin 11b. A second end of the connection member 11L is pin-connected to the bucket 4 with a connection pin 4Pb.

A support member 8 supporting the bell crank 11 is mounted between both ends of the boom 3. The bell crank 11 is pin-connected to the support member 8 with a connection pin 11c at a portion between both ends. With this structure, the bell crank 11 swings about a center axis Z3 of the connection pin 11c. When the bucket cylinder 10 retracts, the first end of the bell crank 11 moves toward the body 2. The bell crank 11 swings about the center axis Z3 of the connection pin 11c, so that the second end of the bell crank 11 moves away from the body 2. With this, the bucket 4 performs the dump action through the connection member 11L. When the bucket cylinder 10 extends, the first end of the bell crank 11 moves away from the body 2. With this, the second end of the bell crank 11 becomes close to the body 2, so that the bucket 4 performs the tilt action through the connection member 11L.

<Boom Angle α and Bucket Angle β>

In the working machine 5, the angle of the boom 3 (hereinafter referred to as a boom angle as necessary) α is the smaller one of the angles made by a straight line L1 linking the center axis Z1 of the connection pin 3P and the center axis Z2 of the connection pin 4Pa and a horizontal line L2 passing through the connection pin 3P and parallel to the contact surface of the front wheels 6F and the rear wheels 6R. In the present embodiment, the boom angle α becomes negative, when the boom 3 tilts toward the road surface R from the horizontal line L2. When the boom 3 moves up, the boom angle α increases.

The angle of the bucket 4 (hereinafter referred to as a bucket angle as necessary) β is an angle made by the road surface R (in FIG. 3, the horizontal line L2 corresponds to the road surface R) and a straight line L3 passing through the center axis Z2 of the connection pin 4Pa and parallel to a bottom surface 4B of the bucket 4. In the present embodiment, the bucket angle β becomes negative when the front of the straight line L3 becomes downward relative to the center axis Z2 of the connection pin 4Pa. When the bucket 4 performs the tilt action, the bucket angle β increases.

The boom angle detection sensor 46 detecting a boom angle α is mounted at the portion of the connection pin 3P which pin-connects the boom 3 to the body 2. The bucket angle detection sensor 47 detecting a bucket angle β is mounted at the portion of the connection pin 11c to indirectly detect the angle of the bucket 4 through the bell crank 11. The bucket angle detection sensor 47 may be mounted at the portion of the connection pin 4Pa which connects the boom 3 and the bucket 4. In the present embodiment, a potentiometer is used for the boom angle detection sensor 46 and the bucket angle detection sensor 47. However, they are not limited thereto.

The boom angle α detected by the boom angle detection sensor 46 becomes an index indicating an orientation of the boom 3. Therefore, the boom angle detection sensor 46 functions as a boom orientation detection device for detecting an orientation of the boom 3. The bucket angle β detected by the bucket angle detection sensor 47 becomes an index indicating an orientation of the bucket 4. Therefore, the bucket angle detection sensor 47 functions as a bucket orientation detection device for detecting an orientation of the bucket 4.

When the operator of the wheel loader 1 operates the boom operation lever 30 or the bucket operation lever 32, the control device 40 acquires a signal of an operation amount of the boom operation lever 30 or the bucket operation lever 32 from the first potentiometer 31 or the second potentiometer 33. The control device 40 then outputs a working machine speed control command corresponding to the signal of the operation amount to the boom-lowering electromagnetic proportional control valve 21, the boom-elevating electromagnetic proportional control valve 22, the bucket dump electromagnetic proportional control valve 23, or the bucket tilt electromagnetic proportional control valve 24.

The boom-lowering electromagnetic proportional control valve 21, the boom-elevating electromagnetic proportional control valve 22, the bucket dump electromagnetic proportional control valve 23, or the bucket tilt electromagnetic proportional control valve 24 outputs a pilot pressure according to the value of the working machine speed control command to the corresponding pilot pressure receiving portion of the boom operation valve 13 or the bucket operation valve 14. With this, the boom cylinder 9 or the bucket cylinder 10 moves in the corresponding direction with the speed according to each pilot oil pressure.

<Dump Approach>

Figure 4:
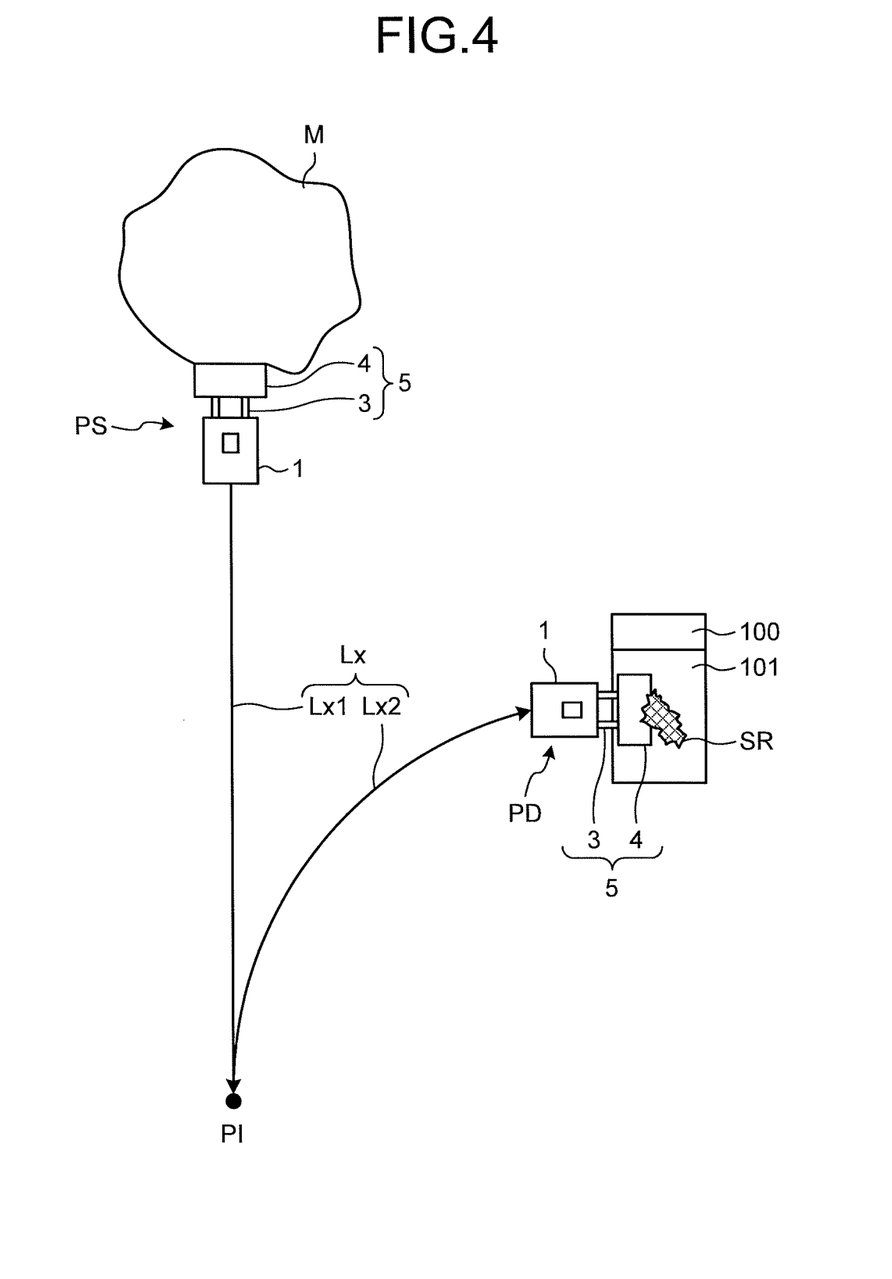
FIG. 4 is a view illustrating one example of an action of a wheel loader after it finishes an excavation work.

FIG. 4 is a view illustrating one example of an action of the wheel loader 1 after it finishes an excavation work. The wheel loader 1 that excavated a subject M to be excavated with the bucket 4 of the working machine 5 retreats from the excavation position PS to a change-of-direction position PI for a change of direction. The wheel loader 1 changes its traveling direction to forward at the change-of-direction position PI, and travels toward a dump truck 100 stopping at the position different from the subject M to be excavated. The wheel loader 1 reaching the position of the dump truck 100 discharges the excavated substances SR in the bucket 4 into a vessel 101 of the dump truck 100. The position where the excavated substances SR in the bucket 4 are discharged is referred to as a discharge position PD.

The boom 3 of the working machine 5 moves up during the period in which the wheel loader 1 retreats from the excavation position PS and travels toward the discharge position PD through the change-of-direction position PI. It is preferable that the boom 3 has a height suitable for the discharge of the excavated substances SR, e.g., has the maximum height, when the wheel loader 1 reaches the discharge position PD. The wheel loader 1 finishing the excavation work elevates the boom 3 during the movement from the excavation position PS to the discharge position PD. A series of the action described above carried out by the wheel loader 1 finishing the excavation work is referred to as a dump approach. In the dump approach, the moving distance of the wheel loader 1 from the excavation position PS to the change-of-direction position PI is Lx1, and the moving distance from the change-of-direction position PI to the discharge position PD is Lx2. The moving distance Lx1 is referred to as a backward distance Lx1, and the moving distance Lx2 is referred to as a forward distance Lx2 below, according to need. In the dump approach, the traveling distance of the wheel loader 1 from the excavation position PS to the discharge position PD becomes Lx (=Lx1+Lx2).

The dump approach is an action in which the wheel loader 1 elevates the boom 3 while traveling. The operator of the wheel loader 1 needs to perform an acceleration work and a brake operation in order to execute the work with optional backward distance Lx1 and forward distance Lx2 according to a situation at a site. In this case, a brake drag might occur on the wheel loader 1. The influence to the operation and brake in the dump approach is affected by the operator's skill. Therefore, in the present embodiment, the dump approach is assisted by an automatic control to facilitate the operation and reduce a load on the brake. A mode for assisting the dump approach with the automatic control is the above-described dump approach mode.

The dump approach is performed during the optional backward distance Lx1 and the forward distance Lx2. Therefore, the operator of the wheel loader 1 senses the balance between the speed of the wheel loader 1 and the elevation speed of the boom 3, and operates the accelerator and the brake according to this balance. Therefore, when the speed of the wheel loader is too fast relative to the elevation speed, the operator has to perform an accelerator operation or an excessive brake operation, which might entail troublesome operation or more brake load or energy loss than necessary. In the dump approach mode, the speed of the wheel loader and the elevation speed of the boom 3 are detected, and the engagement state of the clutch 62 illustrated in FIG. 2 is adjusted in order to attain a balance, which is arbitrarily set, between them. This can implement the speed of the wheel loader according to the elevation speed of the boom 3, whereby the accelerator operation is facilitated, and the brake load caused by the excessive brake operation can be reduced. Thus, the dump approach mode can realize an efficient dump approach without depending on the operator's skill, thereby being capable of suppressing deterioration in durability of the brake of the wheel loader 1. Next, the dump approach mode will be described in more detail.

<Dump Approach Mode>

Figure 5:
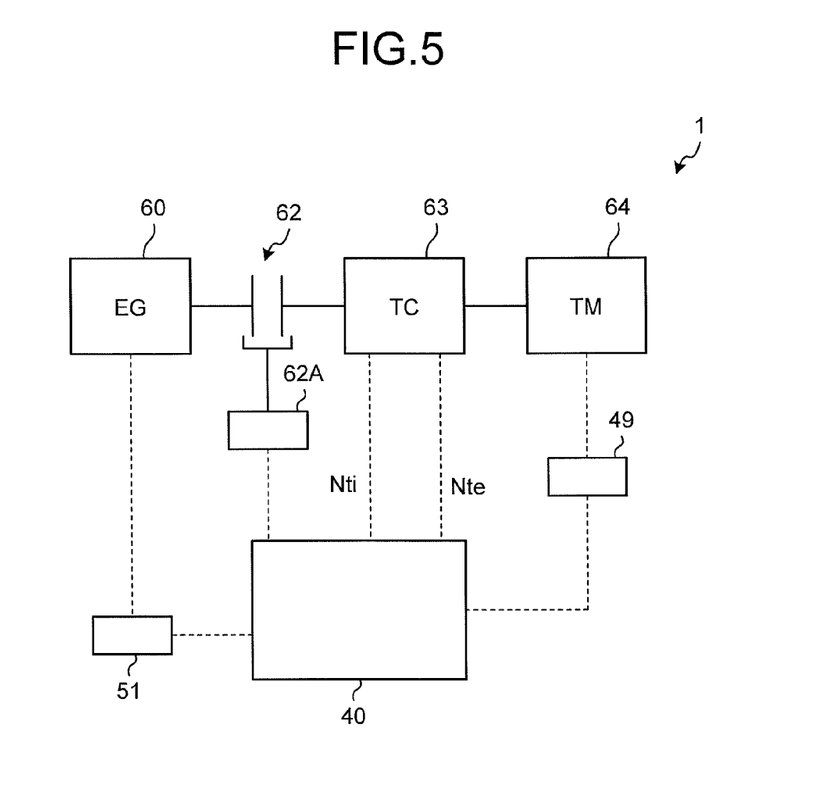
FIG. 5 is a block diagram illustrating a drive system and a control system of the wheel loader.

FIG. 5 is a block diagram illustrating a drive system and a control system of the wheel loader 1. The control device 40 executes the dump approach mode. The dump approach mode is controlled by using a value corresponding to the traveling distance of the wheel loader 1 and a value corresponding to the elevation amount of the boom 3. The control device 40 controls a transmission toque transmitted to the drive wheels of the wheel loader 1 from the engine 60 in order that a difference between later-described first ratio and second ratio becomes zero. In the present embodiment, the control device 40 controls the transmission torque by adjusting the engagement state of the clutch 62. The engagement state of the clutch 62 is changed by adjusting a pressure (clutch pressure) of operating oil supplied to the clutch 62 from a clutch control actuator 62A illustrated in FIG. 5 for the engagement of the clutch 62. With this, the transmission torque is changed.

The transmission torque may be controlled by a method other than the method of adjusting the engagement state of the clutch 62. For example, the control device 40 may control the transmission torque by controlling the torque of the engine 60. In order to control the transmission torque, the control device 40 may also control the brake of the wheel loader 1 to adjust braking force generated from the brake. The brake is mounted between, for example, the transmission device 64 illustrated in FIG. 2 and the drive wheels. Therefore, the control device 40 can also control the transmission torque transmitted to the drive wheels from the engine 60 by controlling the brake.

The first ratio is a ratio between a value corresponding to a target traveling distance that is a target for the wheel loader 1, which starts to move to the discharge position PD where the excavated substances are discharged after the excavation work of the wheel loader 1 with the bucket 4, and a value corresponding to a target elevation amount that is a target for the elevation of the boom 3 after the wheel loader 1 starts to move. The second ratio is a ratio between a value corresponding to a distance (actual traveling distance) in which the wheel loader 1 actually travels after it starts to move to the discharge position PD where the excavated substances SR are discharged after the excavation work of the wheel loader 1 with the bucket 4, and a value corresponding to an actual elevation amount (actual elevation amount) in which the boom 3 is actually elevated after the wheel loader 1 starts to move at the excavation position PS as a starting point after the excavation work of the wheel loader 1 with the bucket 4.

In the present embodiment, the target traveling distance Ld itself is used as the value corresponding to the target traveling distance. The target traveling distance Ld is a target distance for the wheel loader 1 that starts to move from the excavation position PS to the discharge position PD after the excavation work of the wheel loader 1.

The dump approach mode has a stage (first stage) in which the wheel loader 1 moves from the excavation position PS to the change-of-direction position PI, and a stage (second stage) in which the wheel loader 1 moves from the change-of-direction position PI to the discharge position PD. In the present embodiment, the target traveling distance Ld is determined for each stage. For example, the target traveling distance Ld at the first stage can be the backward distance Lx1 from the excavation position PS to the change-of-direction position PI illustrated in FIG. 4. The target traveling distance Ld at the second stage can be the forward distance Lx2 from the change-of-direction position PI to the discharge position PD. As described above, two types of target traveling distances Ld are used in the present embodiment.

Besides the target traveling distance Ld, a target value such as a revolution speed of the drive wheel, or a revolution speed of an output shaft or an input shaft of the transmission device may be used. A displacement (target displacement) Hd that is a target for the boom cylinder 9 illustrated in FIGS. 1 and 2 is used as the value corresponding to the target elevation amount. The target displacement Hd is a displacement of the boom cylinder 9 corresponding to the target elevation amount for the elevation of the boom 3 after the wheel loader 1 starts to move to the discharge position PD from the excavation position PS after the excavation work. Besides the target displacement Hd, a target value such as a boom angle $\alpha$ may be used. The first ratio becomes Ld/Hd.

The target traveling distance Ld is not necessarily determined for each stage in the dump approach mode. For example, an average value of the total of the backward distance Lx1 from the excavation position PS to the change-of-direction position PI illustrated in FIG. 4 and the forward distance Lx2 from the change-of-direction position PI to the discharge position PD may be defined as the target traveling distance Ld.

In the present embodiment, an actual traveling distance La itself is used as the value corresponding to the actual traveling distance. The actual traveling distance La is a distance in which the wheel loader 1 actually travels after starting to move from the excavation position PS to the discharge position PD after the excavation work. Besides the actual traveling distance La, a target value such as a revolution speed of the drive wheel, or a revolution speed of the output shaft or the input shaft of the transmission device may be used. A displacement (actual displacement) Ha of the boom cylinder 9 illustrated in FIGS. 1 and 2 is used as the value corresponding to the actual elevation amount. The actual displacement Ha is a displacement of the boom cylinder 9 corresponding to the actual elevation amount of the boom 3 after the wheel loader 1 starts to move to the discharge position PD from the excavation position PS after the excavation work. Besides the actual displacement Ha, a target value such as an actual boom angle $\alpha$s may be used. The second ratio becomes La/Ha.

The target traveling distance Ld may be determined for each site from the positional relationship between the subject M to be excavated and the dump truck 100, and set with the setting dial 53 illustrated in FIG. 2. The target traveling distance Ld is stored in the memory unit 42 in the control device 40 illustrated in FIG. 2, for example.

The target displacement Hd is obtained from an actual boom angle $\alpha$s at the start of the dump approach mode and a target boom angle $\alpha$t. For example, the target displacement Hd can be obtained by $\alpha t - \alpha s$. As described above, the target traveling distance Ld is determined for each of the first stage and the second stage in the dump approach mode in the present embodiment. Corresponding to this, the target displacement Hd at the first stage is obtained from the actual boom angle $\alpha$s at the excavation position PS and the target boom angle $\alpha t1$ at the change-of-direction position PI, and the target displacement Hd at the second stage is obtained from the actual boom angle $\alpha$s at the change-of-direction position PI and the target boom angle $\alpha t2$ at the discharge position PD. The target boom angles $\alpha t1$ and $\alpha t2$ at the respective stages can arbitrarily be determined.

The actual traveling distance La is obtained by the integration of the speed of the wheel loader 1, for example. In this case, the control device 40 illustrated in FIG. 2 obtains the actual traveling distance La by integrating the speed V detected by the speed sensor 50 with time. When the wheel loader 1 has a positioning system using GPS (Global Positioning System), the control device 40 may obtain the actual traveling distance La from the positioning result.

The actual displacement Ha is geometrically calculated from the boom angle $\alpha$, for example. The control device 40 acquires the boom angle $\alpha$ detected by the boom angle detection sensor 46 illustrated in FIGS. 2 and 3, and geometrically obtains the actual displacement Ha. Alternatively, in order to obtain the actual displacement Ha, a relation between the boom angle $\alpha$ and the displacement of the boom cylinder 9 illustrated in FIGS. 1 and 2 may be obtained beforehand to create a table, and the control device 40 may supply the boom angle $\alpha$ detected by the boom angle detection sensor 46 to this table to acquire the corresponding displacement of the boom cylinder 9.

When the dump approach mode is started, the control device 40 obtains the first ratio Ld/Hd and the second ratio La/Ha in the present embodiment. Then, the control device 40 applies a feedback control to the engagement state of the clutch 62 in such a manner that the difference between the first ratio Ld/Hd and the second ratio La/Ha becomes zero, thereby controlling (applying a feedback control to) the transmission torque transmitted from the engine 60 to the drive wheels of the wheel loader 1.

For example, the case where the second ratio La/Ha is equal to or larger than the first ratio Ld/Hd means that the speed of the wheel loader 1 is relatively high. In this case, the control device 40 decreases the speed of the wheel loader by setting the transmission torque smaller than the value at present. With this, the control device 40 makes the difference between the first ratio Ld/Hd and the second ratio La/Ha closer to zero. For this, the control device 40 sets the command value of the clutch pressure (hereinafter referred to as a clutch pressure command value, according to need) Pd to be smaller than the value at present to make the clutch pressure lower than the value at present. With this, the control device 40 makes the torque transmitted by the clutch 62 lower than the value at present. In this way, the control device 40 sets the transmission torque to be smaller than the value at present. This consequently results in the height of the boom 3 suitable for the discharge of the excavated substances SR, when the wheel loader 1 reaches the discharge position PD illustrated in FIG. 4.

The case where the second ratio La/Ha is smaller than the first ratio Ld/Hd means that the speed of the wheel loader 1 is relatively low. In this case, the control device 40 increases the speed of the wheel loader by setting the transmission torque to be larger than the value at present. With this, the control device 40 makes the difference between the first ratio Ld/Hd and the second ratio La/Ha closer to zero. For this, the control device 40 sets the clutch pressure command value Pd to be larger than the value at present to make the clutch pressure higher than the value at present. With this, the control device 40 makes the torque transmitted by the clutch 62 higher than the value at present. In this way, the control device 40 sets the transmission torque to be larger than the value at present. This consequently results in the height of the boom 3 suitable for the discharge of the excavated substances SR, when the wheel loader 1 reaches the discharge position PD illustrated in FIG. 4.

In the dump approach mode, the operator of the wheel loader 1 operates the input device 45S illustrated in FIG. 2 to change the mode to the dump approach mode, for example. After this operation, the operator operates the boom operation lever 30 to the position with the maximum boom angle αmax, and sets the selector lever 18L illustrated in FIG. 2 to reverse. Then, the operator presses on the accelerator. With such operation, the control device 40 controls the speed of the wheel loader 1 according to the elevation of the boom 3. The control device 40 stops the wheel loader 1, which is now moving backward, at the change-of-direction position PI illustrated in FIG. 4. After the wheel loader 1 which is now moving backward stops, the operator changes the selector lever 18L to forward with his/her foot on the accelerator. The control device 40 allows the wheel loader 1 to travel while elevating the boom 3. The operator operates the steering wheel to allow the wheel loader 1 to travel toward the discharge position PD illustrated in FIG. 2 with his/her foot on the accelerator. After the wheel loader 1 reaches the discharge position PD, the control device 40 stops the elevation of the boom 3, and releases the clutch 62 to make the transmission torque zero. In this case, the boom 3 of the wheel loader 1 has a height suitable for the discharge of the excavated substances SR. The operator operates the brake of the wheel loader 1 according to need to stop the wheel loader 1, and then, discharges the excavated substances SR in the bucket 4.

As described above, the operation of the operator during the execution of the dump approach mode is substantially only to press on the accelerator, except for the operation for the steering wheel. This can allow the operator to implement the dump approach with a simple operation, whereby the load on the operator can be reduced. In addition, the dump approach mode can quickly finish the dump approach, or can suppress the number of times of redoing the dump approach, whereby work efficiency can be enhanced.

In the dump approach mode, unnecessary brake operation is prevented, whereby the load on the brake, the torque converter 63, or other components of the wheel loader 1 can be reduced. Consequently, deterioration in durability of these components can be prevented. A less skilled operator can implement the similar dump approach only by a simple operation by selecting the dump approach mode. A skilled operator can smoothly execute the dump approach without selecting the dump approach mode. However, work efficiency is likely to be gradually reduced due to fatigue and loss of concentration in a long-term work. The dump approach mode reduces the load on the operator. Therefore, the reduction in work efficiency is suppressed by fatigue reduction and inhibition in loss of concentration during a long-term work. As described above, the dump approach mode has advantages of reduction in a load on an operator and enhancement in work efficiency without depending on an operator's skill.

<Addition of Feedforward Control>

Figure 6:
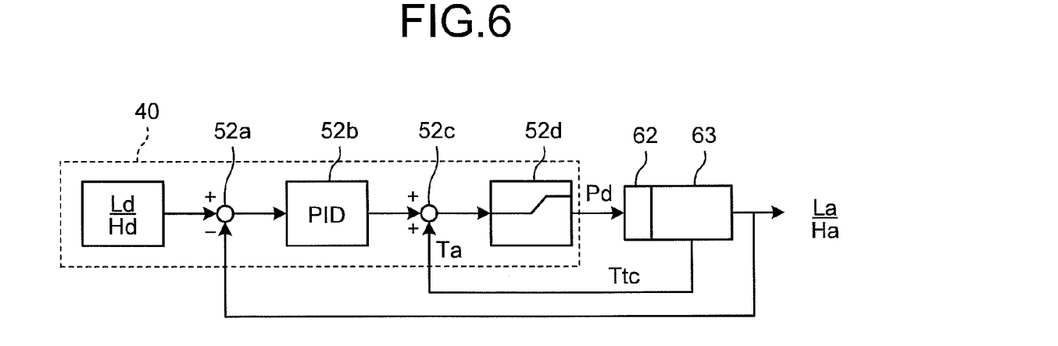
FIG. 6 is a diagram illustrating one example of a control block when a feedforward control is performed in addition to a feedback control.

FIG. 6 is a diagram illustrating one example of a control block when a feedforward control is performed in addition to a feedback control. In the present embodiment, the control device 40 applies a feedback control to the transmission torque. However, the control device 40 may additionally apply a feedforward control to the transmission torque. According to this control, the control responsiveness of the transmission torque is enhanced. Consequently, hunting of transmission torque due to a response delay can be suppressed.

As illustrated in FIG. 6, the control device 40 generates the first ratio Ld/Hd, and inputs the generated first ratio to a subtractor 52a. The second ratio La/Ha obtained based on the actual traveling distance of the wheel loader 1 and the actual displacement amount of the boom cylinder 9 is inputted to the subtractor 52a. The subtractor 52a supplies the difference between the first ratio Ld/Hd and the second ratio La/Ha to a PID control unit 52b. The PID control unit 52b generates a control signal by which the difference between the first ratio Ld/Hd and the second ratio La/Ha becomes zero, and outputs this signal to an adder 52c. The control signal from the PID control unit 52b and an actual transmission torque ratio Ta are inputted to the adder 52c.

The actual transmission torque ratio Ta is Ttc/Tcmax, and it indicates a torque ratio between the input side and the output side of the torque converter 63. Ttc is a torque (absorption torque) absorbed by the torque converter 63 illustrated in FIG. 6. It can be obtained from a revolution speed Nti at the input side and a revolution speed Nte at the output side illustrated in FIG. 5. Tcmax is the maximum torque the clutch 62 illustrated in FIG. 6 can transmit. In the present embodiment, Tcmax is the torque when the pressure (clutch pressure) of operating oil supplied for the engagement of the clutch 62 is the maximum. Tcmax is determined beforehand according to a specification of the clutch 62.

The adder 52c outputs a value obtained by adding the control signal from the PID control unit 52b and the actual transmission torque ratio Ta. This value is outputted as a clutch pressure command value Pd, after an abnormal value is removed by a limiter 52d. In the present embodiment, the clutch pressure command value Pd is a command value of the clutch pressure. The clutch 62 to which the clutch pressure command value Pd is inputted acts such that the clutch pressure becomes the clutch pressure command value Pd. As described above, the control device 40 applies a feedforward control to the transmission torque by using the actual transmission torque ratio Ta, and applies the feedback control to the transmission torque in order that the difference between the first ratio Ld/Hd and the second ratio La/Ha becomes zero. Specifically, the feedback control is applied to the transmission torque in such a manner that the difference between the first ratio Ld/Hd and the second ratio La/Ha becomes zero on the basis of the torque actually transmitted to the driving wheels. This can suppress hunting of the transmission torque caused by a response delay.

<Control of Torque of Engine 60 According to Engagement State of Clutch 62>

Figure 7:
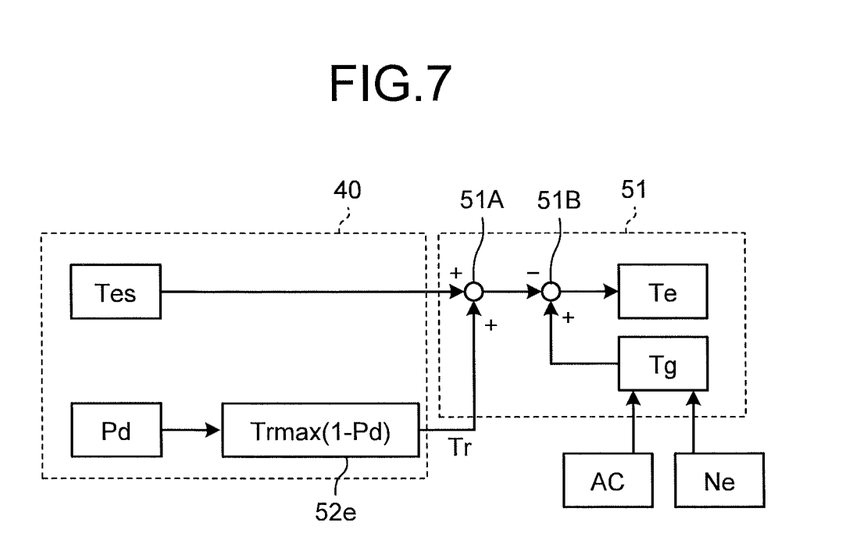
FIG. 7 is a diagram illustrating one example of a control block upon controlling an engine torque according to an engagement state of a clutch.
Figure 8:
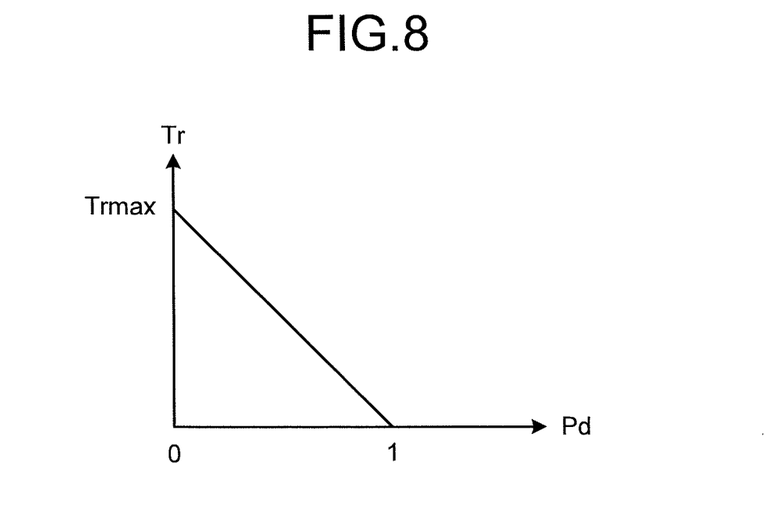
FIG. 8 is a conceptual view for describing a reduction amount of an engine torque.

FIG. 7 is a diagram illustrating one example of a control block upon controlling a torque of the engine 60 according to an engagement state of the clutch 62. FIG. 8 is a conceptual view for describing a reduction amount of a torque of the engine 60. In the present embodiment, the control device 40 may adjust a torque generated from the engine 60 according to the engagement state of the clutch 62 illustrated in FIG. 2 or other figures. In this case, the control device 40 adjusts a torque generated from the engine 60 based on the clutch pressure command value Pd, for example.

The control device 40 generates a reduction amount (first torque reduction amount) Tes of a torque generated from the engine 60, and outputs this amount to the engine control device 51. The first torque reduction amount Tes is a reduction amount for reducing a torque from the engine 60 to suppress a slip caused by slipping driving wheels of the wheel loader 1, for example. In this case, if the driving wheels have no slip, the first torque reduction amount Tes becomes zero. The control device 40 also generates a clutch pressure command value Pd, and outputs this value to an engine torque reduction unit 52e. The engine torque reduction unit 52e obtains a reduction amount (second torque reduction amount) Tr of the torque based on the engagement state of the clutch 62. In the present embodiment, the second torque reduction amount Tr is obtained from Trmax×(1−Pd), for example. Trmax is the maximum value of the second torque reduction amount Tr, and is set to any value. As illustrated in FIG. 8, the second torque reduction amount Tr becomes smaller with the increase in the clutch pressure command value Pd, for example. In the case of Pd=0, the clutch 62 is released, and in the case of Pd=1, the clutch 62 is fully engaged.

The first torque reduction amount Tes and the second torque reduction amount Tr are supplied from the control device 40 to an adder 51A of the engine control device 51, and they are added. The calculation result of the adder 51A is outputted to a subtractor 513. The engine control device 51 determines a torque Tg that is to be generated from the engine 60 based on an accelerator opening AC and an engine speed Ne of the engine 60. The torque Tg is inputted to the subtractor 51B. The subtractor 51B subtracts the calculation result of the adder 51A from the torque Tg. In other words, the calculation result of the subtractor 51B becomes Tg−(Tes+Tr). The calculation result of the subtractor 51B is a command value Te of the torque that is to be finally generated from the engine 60. The engine control device 51 calculates an amount of fuel necessary for allowing the engine 60 to generate the torque corresponding to the command value Te of the torque, and allows a fuel supply device in the engine 60 to supply a calculated amount of fuel.

With the above control, the control device 40 can adjust the torque of the engine 60 according to the engagement state of the clutch 62. The engagement state of the clutch 62 is changed such that the clutch 62 can transmit more torque with the increase in the clutch pressure command value Pd. As illustrated in FIG. 8, the smaller the clutch pressure command value Pd becomes, the larger the second torque reduction amount Tr becomes, and the larger the clutch pressure command value Pd becomes, the smaller the second torque reduction amount Tr becomes, in the present embodiment.

When the control device 40 relatively decreases the clutch pressure command value Pd of the clutch pressure supplied to the clutch 62 during the execution of the dump approach mode, the second torque reduction amount Tr relatively increases. The control device 40 then generates the second torque reduction amount Tr so as to relatively decrease the torque generated from the engine 60. Accordingly, the torque generated from the engine 60 reduces. This can consequently suppress an unnecessary rise in the engine speed Ne of the engine 60, thereby being capable of suppressing an increase in fuel consumption. When the control device 40 relatively increases the clutch pressure command value Pd of the clutch pressure supplied to the clutch 62 during the execution of the dump approach mode, the second torque reduction amount Tr relatively decreases. The control device 40 then generates the second torque reduction amount Tr so as to relatively increase the torque generated from the engine 60. Accordingly, the torque generated from the engine 60 increases. Consequently, the speed of the wheel loader 1 increases.

When the control device 40 adjusts the torque generated from the engine 60 according to the engagement state of the clutch 62 in the dump approach mode, the fuel consumption amount is decreased by 3%, compared to the case where this adjustment is not performed. As described above, the execution of the control of the torque from the engine 60 according to the engagement state of the clutch 62 during the execution of the dump approach mode is effective to improve fuel efficiency of the wheel loader 1.

When the brake of the wheel loader 1 is used in the dump approach mode instead of the adjustment of the engagement state of the clutch 62, the control device 40 does not obtain the second torque reduction amount Tr. In this case, the control device 40 reduces the torque generated from the engine 60 with the first torque reduction amount Tes.

<Setting Dial 53>

Next, the setting dial 53 illustrated in FIG. 2 will be described. In the present embodiment, the setting dial 53 can change the first ratio Ld/Hd that is a target value in the dump approach mode. The first ratio Ld/Hd is a ratio between the target traveling distance Ld and the target displacement Hd. The setting dial 53 can change the first ratio Ld/Hd by changing at least one of them. The setting dial 53 may be configured to be capable of changing the first ratio Ld/Hd itself, or to be capable of changing the first ratio Ld/Hd by individually changing the target traveling distance Ld and the target displacement Hd. Since the first ratio Ld/Hd can be changed, the operator of the wheel loader 1 can adjust the action of the dump approach mode according to his/her favor or the condition of the site of work. Therefore, this is preferable.

While certain embodiments have been described above, these embodiments are not intended to limit the scope of the inventions. Further, it should be noted that components described herein may be replaced with other components that are obvious to those skilled in the art and are substantially equal, i.e., are equivalent. Further, the components described above may be combined on an optional basis. At least one of various omissions, substitutions and changes in the form of the embodiments described herein may be made without departing from the spirit of the embodiments.

REFERENCE SIGNS LIST

1 WHEEL LOADER
2 BODY
3 BOOM
4 BUCKET
5 WORKING MACHINE

6F FRONT WHEEL
6R REAR WHEEL
9 BOOM CYLINDER
13 BOOM OPERATION LEVER
18L SELECTOR LEVER
40 CONTROL DEVICE
41 PROCESSING UNIT
42 MEMORY UNIT
43 INPUT UNIT
44 OUTPUT UNIT
45 INPUT/OUTPUT DEVICE
46 BOOM ANGLE DETECTION SENSOR
48 BOOM CYLINDER PRESSURE SENSOR
49 TM CONTROL DEVICE
50 SPEED SENSOR
51 ENGINE CONTROL DEVICE
52$e$ ENGINE TORQUE REDUCTION UNIT
52$b$ PID CONTROL UNIT
53 SETTING DIAL
60 ENGINE
62 CLUTCH
63 TORQUE CONVERTER
64 TRANSMISSION DEVICE
100 DUMP TRUCK
Ha ACTUAL DISPLACEMENT
Hd TARGET DISPLACEMENT
La ACTUAL TRAVELING DISTANCE
Ld TARGET TRAVELING DISTANCE
La/Ha FIRST RATIO
Ld/Hd SECOND RATIO
Pd CLUTCH PRESSURE COMMAND VALUE
SR EXCAVATED SUBSTANCE
Ta ACTUAL TRANSMISSION TORQUE RATIO
Tr SECOND TORQUE REDUCTION AMOUNT

The invention claimed is:

1. A work vehicle comprising:
a body;
a power generating device that generates power for allowing the body to travel;
a driving wheel that travels the body with power generated by the power generating device;
a boom that is supported to the body so as to swing, and supports a bucket at a side opposite to the body;
an actuator that swings the boom; and
a control device that controls a transmission torque transmitted to the driving wheel from the power generating device in such a manner that a difference between a first ratio and a second ratio becomes zero,
the first ratio being a ratio between a value corresponding to a target traveling distance that is a target for the body when the body travels to a position where an excavated substance is discharged after an excavation with the bucket, and a value corresponding to a target elevation amount that is a target for an elevation of the boom after a start of a motion,
the second ratio being a ratio between a value corresponding to an actual traveling distance of the body after the body starts the body's motion to the position where the excavated substance is discharged after the excavation with the bucket, and a value corresponding to an actual elevation amount of the boom after the motion is started.

2. The work vehicle according to claim 1, comprising a clutch between the power generating device and the driving wheel, wherein
the control device controls the transmission torque by adjusting an engagement state of the clutch.

3. The work vehicle according to claim 2, comprising: a torque converter which transmits power from the clutch to the driving wheel between the clutch and the driving wheel, wherein
the control device applies a feedforward control to the transmission torque by using a ratio between a torque absorbed by the torque converter and a maximum torque that the clutch can transmit.

4. The work vehicle according to claim 2, wherein
the control device controls a torque generated by the power generating device according to the engagement state of the clutch.

5. The work vehicle according to claim 1, comprising:
a target value changing unit that changes at least one of the target traveling distance and the target elevation amount.

6. A work vehicle comprising:
a body;
a power generating device that generates power for allowing the body to travel;
a driving wheel that travels the body with power generated by the power generating device;
a clutch provided between the power generating device and the driving wheel;
a torque converter provided between the clutch and the driving wheel;
a boom that is supported to the body so as to swing, and supports a bucket at a side opposite to the body;
a hydraulic cylinder that swings the boom; and
a control device that applies a feedback control to an engagement state of the clutch and applies a feedforward control to the engagement state of the clutch by using a ratio between a torque absorbed by the torque converter and a maximum torque that the clutch can transmit, in such a manner that a difference between a first ratio and a second ratio becomes zero,
the first ratio being a ratio between a value corresponding to a target traveling distance that is a target for the body when the body travels to a position where an excavated substance is discharged after an excavation with the bucket, and a value corresponding to a target elevation amount that is a target for an elevation of the boom after a start of a motion,
the second ratio being a ratio between a value corresponding to an actual traveling distance of the body after the body starts the body's motion to the position where the excavated substance is discharged after the excavation with the bucket, and a value corresponding to an actual elevation amount of the boom after the motion is started.

* * * * *